(No Model.)
E. W. KUHN.
PROCESS OF AND APPARATUS FOR STERILIZING LIQUIDS.
No. 597,082. Patented Jan. 11, 1898.
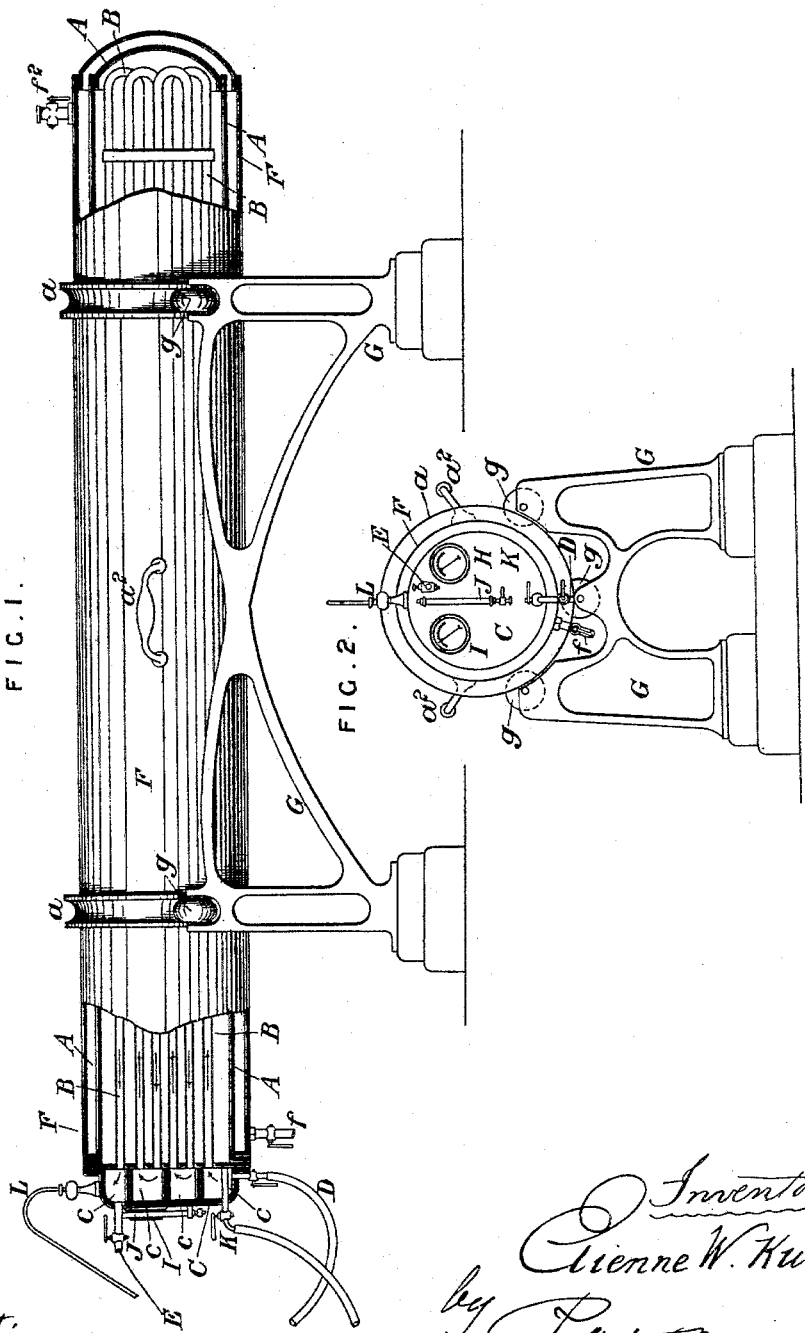

UNITED STATES PATENT OFFICE.

ETIENNE W. KUHN, OF PARIS, FRANCE.

PROCESS OF AND APPARATUS FOR STERILIZING LIQUIDS.

SPECIFICATION forming part of Letters Patent No. 597,082, dated January 11, 1898.

Application filed May 14, 1895. Serial No. 549,283. (No model.) Patented in Belgium October 15, 1894, No. 112,247.

*To all whom it may concern:*

Be it known that I, ETIENNE WILLIAMS KUHN, engineer, a citizen of the French Republic, residing at 42 Rue du Louvre, Paris, in the Republic of France, have invented certain Improvements in Processes of and Apparatus for Sterilizing Liquids, (for which I have obtained a patent in Belgium, dated October 15, 1894, No. 112,247,) of which the following is a specification.

This invention has reference to the sterilization of liquids; and its object is to sterilize liquids—such as beer, milk, and the like—in bulk without physical, chemical, or organic change taking place therein.

Prior to my invention the successful commercial sterilization in bulk of liquids, such as beer and milk, had never been accomplished, and where such liquids had been sterilized at all they were treated in small quantities—such as in bottles, cans, &c.—with results far from satisfactory.

The various applications of heat which have hitherto been tried for the sterilization of fermented liquids have not given satisfactory results for commercial purposes, partly because the processes employed did not permit the treatment of sufficiently large masses at one operation and partly because the changes brought about in the nature or condition of the liquid by the treatment to which it was subjected in apparatus such as have been used hitherto impaired the commercial value of the product.

I observed that the heat applied in prior processes of sterilization, while effective for the purpose of destroying micro-organisms in the liquid, also had injurious effects, such as causing alterations in the taste, smell, color, or limpidity of the liquid treated. The failures hitherto met with were therefore due in large part to the fact that up to the present time means have never been provided which fulfilled the necessary conditions for homogeneous and composite sterilization while retaining the liquid in an unaltered condition physically, chemically, and organically.

The absence of homogeniety or uniformity in the effect produced and of completeness in sterilization is owing to the fact that the temperature is not regular throughout the mass of liquid, because the liquids being bad heat-conductors heat is not evenly diffused, and consequently the temperature is not the same throughout the different portions of the liquid unless the liquid be submitted to agitation. The agitation or stirring devices hitherto employed for this purpose have been attended by serious drawbacks, as they interfered with the lightness of the chambers or receivers used or gave rise to the danger of considerable loss of gas, especially of carbonic-acid gas, in the case of treating fermented liquid, which gas in escaping carries away with it the aromatic principles which impart the peculiar qualities to beer and like liquids.

The abandonment of previous sterilizing methods has also been due to certain peculiar and hitherto inexplicable disturbances which take place in the liquids treated and which may manifest themselves some considerable time after the operation. These disturbances have hitherto been attributed to the action of heat; but I have found by analysis that they are due to the partial decomposition produced by contact with the metals hitherto employed for the apparatus, and that the only metals which will not cause such disturbances are silver, gold, or platinum and certain other metals of the same class, such as palladium and iridium; but for practical purposes silver will of course be generally used, and I will refer to the lining as being of silver. When metals other than these come in contact with a heated and fermented liquid, metal hydroxids form, and these react upon the nitrogenous and albuminoid matters contained in the liquid and cause them to be precipitated. Other reactions of a very complicated nature also take place between the organic acids and the metals, which reactions it is particularly important to avoid, especially where beer, for instance, is the liquid treated.

The principal object of my invention is therefore to retain the useful effects resulting from heating the liquid—viz., the destruction of the micro-organisms existing in the liquid—while avoiding the injurious and undesirable effects resulting therefrom—viz., physical, chemical, or organic changes in the liquid.

To this end the improved process constituting part of my invention consists in producing a rapid and uniform distribution of the heat throughout the mass of liquid, so that the latter is quickly and homogeneously heated to a temperature sufficient to effect the destruction of micro-organisms or bacteria in the liquid, and in then quickly and homogeneously cooling the mass of liquid before the high temperature produces a chemical or physical effect, such as boiling, this operation being conducted under conditions, as herein specified, such that the causes of alteration of taste, appearance, &c., explained above are wholly removed.

In furtherance of the object of my invention apparatus is provided whereby the various inconveniences and objections hereinbefore referred to are entirely avoided and whereby the process above indicated can be carried out, resulting in homogeneous, regular, and perfect sterilization without any physical, chemical, or organic change taking place in the liquid treated or its utility for human consumption being detrimentally affected.

To this end my apparatus consists of a vessel or chamber capable of being tightly closed and of resisting such pressures as are employed in the operation and having such internal arrangements as to dispose the mass of liquid contained therein in strata of but slight depth or thickness in contact with surfaces capable of being quickly heated and cooled by a circulating medium, as hereinafter more fully explained.

In order to prevent chemical reaction taking place between the metal of the vessel and the liquid being sterilized, a lining or coating of silver is applied to the surfaces of the vessel and the internal arrangements thereof with which the liquid makes contact.

It is advisable that the length of the cylinder or vessel should be at least six times greater than its diameter, so that the liquid layer shall have but little height or depth, and by this means differences of temperature between the top and bottom portions of the liquids are avoided.

To this cylinder or vessel a gyratory or oscillatory or equivalent movement can be imparted by mounting it upon spindles, pivots, rolls, or other similar devices, enabling it to be partially rotated through an angle varying, say, between one hundred and eighty degrees in each direction—that is, permitting it to perform a semirevolution in each direction, so that what was before the top of the apparatus becomes its bottom, and vice versa, whereby an intermixture of the liquid divided into layers or zones differing in temperature and density is effected. The said cylinder or vessel is provided with an outer casing or jacket and with tubes or equivalent passages running through its interior for the passage of the heating and cooling medium, and the motion imparted to it, while enabling it to remain tightly closed, has the effect of causing the said internal tubes or passages to act as an agitating device of great efficiency, which in the most satisfactory manner effects the complete mixture of the liquid and insures homogeneousness of the treatment throughout.

As already explained, to prevent the treatment causing changes in the taste, flavor, or odor of the liquid treated the time of heating is made as short as possible, too intense a heat being avoided; but the heating surfaces being as numerous or extended as possible physiological effects are more rapidly obtained than physical or chemical effects, and they bear a more direct relation to the factor temperature than to the factor time, so that by rapid and brief application of high temperature a zymotechnical sterilizing effect is obtained, and on this taking place the application of heat should cease before it has time to bring about a chemical or physical effect, such as boiling or other cause of undesirable change due to the continual action of heat. The inner tubes or passages and the outer casing and the passage therethrough of a heating agent and then of an intensely cold agent, as ice-water or incongealable cold liquid or brine, enables the liquid treated to be raised to the sterilizing temperature in a short time, and to be maintained at that temperature just as long as and not longer than the time strictly necessary for the attainment of the desired sterilizing effect. When this is attained, the liquid treated is immediately cooled down to its original temperature, the maintenance of any high or intermediate temperature liable to prove harmful being carefully avoided. This method enables sterilization to be attained in a satisfactory manner, while avoiding the least modification in the taste, odor, or nature of the liquid treated, and it gives a result totally different from that obtained by the slow heating and cooling processes performed in bottles or like receptacles, in which the conditions hereinbefore defined have not been provided for.

By plating with silver the injurious metal surfaces with which the liquids to be sterilized (more particularly fermented liquors) would otherwise come into contact decomposition is entirely avoided and the injurious disturbances which hitherto have been solely ascribed to heat, but are due to contact with such injurious metal surfaces, are prevented.

In the accompanying drawings I have shown an apparatus constructed according to my invention.

Figure 1 is an elevation of the apparatus, partly in section; and Fig. 2 is an end view of the same from the entrance or admission end, being the left-hand end, Fig. 1.

The apparatus consists of a tightly-closed cylinder A—say of copper. Its interior is silver-plated and it has a length, say, at least about six times greater than its diameter. It is arranged horizontally or practically horizontally and is traversed longitudinally by a series of tubes B, set very closely together and, say, of copper, and they are silvered on their exteriors. These tubes are arranged in horizontal tiers and their ends are secured in front to the end plate, over which is fixed a box or chamber C, forming the end of the apparatus, the said box or chamber C being divided into a number of superposed compartments $c$, into which the ends of the tubes B open, so as to constitute with the said tubes a continuous passage. This chamber C is connected with the cylinder by very closely set bolts, so that a hermetically-tight joint is formed. The bottom and top compartments $c$ have respectively connected with them the pipes D and E, constituting the inlet and exit for the heating and cooling agent. The said cylinder A is covered by a jacket F, with an inlet at one end and an outlet at the other end $(f f^2)$ for the entrance and exit of the heating and cooling fluid to and from the space between the jacket F and cylinder A. The said cylinder A is supported by the rings $a$, which rest on rollers $g$, supported by the framing or support G.

The apparatus is provided at one end with a pressure-gage H, a thermometer or temperature-indicator I, a liquid-gage J, a filling and discharge cock K, and an air-exhaust cock L.

To the cylinder A handles $a^2$ are secured, which enable the operator to impart oscillation in both directions to the said cylinder with the greatest ease and with the requisite amplitude of movement, (no matter what the dimensions or the weight of the apparatus may be,) owing to its being supported by rollers. In the case of a very large sized apparatus one of the rings $a$ may be replaced by a toothed wheel, with which engages a pinion, by means of which semi or partial rotary motion can be given to the cylinder A, or any other suitable means for giving the necessary motion to the cylinder can be used.

The liquid to be sterilized having been filtered or strained, (if necessary, under pressure,) is conveyed through the pipe and cock K into the cylinder A, while the air contained in the latter escapes through the outlet or discharge cock L. A line marked upon the liquid-gage J indicates the point which should not be exceeded in the level of liquid in the cylinder, so as to allow of the necessary pressure being attained and of the necessary space above for permitting the gases and volatile principles of the liquid under treatment to remain in such a way that chemical disassociation is prevented and retention of the said gases and volatile principles is insured when the pressure is relieved on cooling. When the apparatus is filled sufficiently, the cocks K and L are closed. Hot water or other heating agent from any suitable source of supply is then admitted through the pipes D and $f$, which are fully opened for the purpose. The temperature of such water or heating agent should not exceed by more than ten degrees the final temperature for sterilization, as any contact between the liquid treated and a surface heated to a higher temperature would cause changes to occur in those portions of the liquid so brought into contact with the superheated surfaces, and it is an object in carrying out my invention to avoid this by insuring absolute uniformity of heating effect throughout the liquid under treatment. The hot water or other heating agent flows through the rows of tubes B in succession, and through the compartments $c$, as indicated by the arrows, so that it traverses the said tubes in two directions, passing from one end of the apparatus to the other and then back again alternately, thus exerting its maximum heating effect in a thoroughly equalized way upon the liquid under treatment, and on arriving at the inner compartment $c$ the liquid escapes through the outlets. Hot water or other heating agent also passes through the jacket F, entering by the inlet $f$ and leaving by the outlet $f^2$. The liquid to be treated, being thus in contact on all sides with the heating medium, is in a short time raised to sterilizing heat, and when this has been attained the supply of hot water or other heating agent employed is discontinued after the zymotechnical and physiological effects of the destruction of micro-organisms or bacteria have been produced, care being taken to impart to the cylinder A alternating rotary or oscillatory movements, preferably not less than one hundred and eighty degrees in amplitude, the effect of such movements being to render the temperature of the whole liquid mass perfectly uniform or homogeneous. The pipes connected with the apparatus may be made of india-rubber or other flexible material to enable them to follow the movements of the cylinder. When the desired result is attained, there is admitted through the same passages as those by which the hot water or other heating agent was previously admitted and caused to circulate in the same manner the cooling agent—say ice-water—at about zero temperature, or, better still, uncongealable liquid at 10° centigrade, supplied from cold-producing machines, which cooling medium causes instantaneous cooling of the liquid under treatment to take place, and in a very short time the whole of the liquid will in consequence fall to its initial low temperature. During this cooling process all the gaseous volatile principles are retained by the cooled liquid, which thus does not lose its original properties. The operation is then completed, and the sterilized liquid, the other properties of which have undergone no substantial alteration whatever, may be decanted or drawn off for use or be introduced into sterilized casks or other vessels for shipment or storage, if necessary, the precautions being taken of previously washing the vessel with an antiseptic and subsequent introduction of the fluid by isobarometric pressures into such vessel, so as to avoid any infection from noxious germs and any subsequent loss of gas.

To recapitulate, the characteristic features of the invention explained in the foregoing description and which are for the most part necessary to practical success (said invention having as its primary object the sterilization for the market on a large scale—that is to say, in large quantities and in a practical manner—those liquids—such as beer, milk, wine, cider, vegetable-sugar juices, &c.—which are known to be most liable to changes for converting them into aseptic and unchangeable liquids which retain all their other qualities intact, such qualities being retained by the avoidance of producing any permanent chemical, physical, or organic changes in the liquid during the treatment) may be summarized as follows: The liquid in large quantities is placed in a hermetically-sealed vessel capable of withstanding heavy internal pressure and wherein it (the liquid) is disposed in thin strata or layers, so as to be quickly and homogeneously heated and chilled, as desired, throughout its entire mass, thereby facilitating and permitting instantaneous changes in temperature necessary to the sterilization of the liquid. The changes in temperature referred to here are, first, quick heating of the liquid to a temperature at which the zymotechnical effect of destruction of micro-organisms or bacteria is attained. As soon as this heating is commenced the expansion or dilation of the liquid in the vessel reduces the gaseous vacuum and creates a high pressure (higher than six kilos, for example) before the liquid has had time to become heated to a temperature capable of changing it in the absence of pressure, and this pressure prevents the gases from being lost or wasted by keeping them soluble. As before stated, the expansion of the liquid due to the heating thereof generates extreme internal pressure, which the vessel must be capable of withstanding. The next change of temperature is, second, the quick cooling of the liquid before the high temperature produces a chemical or physical effect, such as boiling. The sudden cooling causes the liquid to again take up or absorb the gases expanded by the heating, such gases often being a constituent necessary to the marketable value of the liquid.

In an apparatus for carrying out the process of this invention it is essential, first, that it should distribute the liquid in thin layers or strata, giving a large contact-surface for imparting the heating and cooling effects; second, that the liquid be agitated (not violently) to homogeneously distribute such effects; third, it is absolutely indispensable that the surface with which the liquid makes contact be coated with silver (or its equivalent mentioned in the foregoing explanation) for the preventing of the formation of metallic hydroxids at a high temperature and under pressure; fourth, it is necessary to the proper agitation of the liquid that the vessel be oscillated upon suitable bearings; fifth, means must be provided for circulating heating and cooling agents over the contact-surfaces. All these requirements are best fulfilled by the apparatus shown in the drawings, wherein the tubes through which the heating and cooling medium circulates also serve the function of agitators.

The temperatures to which it is necessary to heat the liquid and the time required to carry out the process of course vary somewhat with different liquids. The following indications of temperature and durations with the principal liquids to which this process is applicable may be followed with good results: beer—temperature, 80° centigrade—duration of process, thirty minutes; milk—temperature, 110° centigrade—duration of process, five minutes; water—temperature, 110° centigrade—duration of process, twenty minutes; wine—temperature, 70° centigrade—duration of process, fifteen minutes; grape-must—temperature, 90° centigrade—duration of process, twenty minutes.

Having thus described my invention, what I claim as new, and desire to secure by Letters Patent, is—

1. The process of sterilizing liquids in bulk, consisting in quickly and homogeneously heating them in a closed vessel to a sterilizing temperature, and then quickly and homogeneously cooling the whole mass of liquid after the desired physiological changes have taken place, but before the high temperature causes injurious chemical or physical changes, said operations being performed out of contact with metals which are chemically acted upon by corrosive agents generated in the liquid during the sterilization, as set forth.

2. The process of sterilizing liquids in bulk, consisting in placing the liquid in a closed vessel in contact with incorrodible surfaces, leaving a space for liquid expansion such that the pressure developed by heating the liquid will prevent chemical disassociation of the volatile aromatic principles, quickly and uniformly raising the liquid to the sterilizing temperature, and cooling the same before the high temperature causes injurious chemical or physical changes, substantially as described.

3. In apparatus for sterilizing liquids, a practically horizontal cylinder or vessel for containing the liquid to be treated, adapted to be tightly closed, of a diameter or width small in comparison to its length, a series of longitudinal tubes or passages extending substantially the length of and disposed substantially uniformly throughout the interior of the cylinder, a casing or jacket about the cylinder, means for supplying a heating agent and a cooling agent to said jacket and tubes or passages and means for imparting an oscillatory movement to the cylinder about its longitudinal axis, as set forth.

4. In apparatus for sterilizing liquids, a practically horizontal cylinder or vessel for containing the liquid to be treated adapted to be tightly closed, of a diameter or width small in comparison to its length, a series of longitudinal tubes or passages extending substantially the length of and disposed substantially uniformly throughout the interior of the cylinder, a casing or jacket about the cylinder, means for supplying a heating and a cooling agent to said jacket and tubes or passages, and means for imparting an oscillatory movement to the cylinder about its longitudinal axis, the surfaces in and of the cylinder and other parts of the apparatus with which the liquid being treated makes contact being provided with a coating of silver, substantially as described.

In testimony whereof I have signed my name to this specification in the presence of two subscribing witnesses.

E. W. KUHN.

Witnesses:
A. GURTZ,
MICHEL BRIAND.